April 14, 1970 H. M. HARRIS, JR 3,506,785

SYNCHRONIZED ASYNCHRONOUS FACSIMILE COMMUNICATION SYSTEM

Filed Sept. 30, 1966 7 Sheets-Sheet 1

INVENTOR.
HALBERT M. HARRIS, JR
BY
Anthony [signature]
ATTORNEY

INVENTOR.
HALBERT M. HARRIS, JR
BY Anthony D. Cennamo
ATTORNEY

INVENTOR
HALBERT M. HARRIS, JR
BY Anthony D. Cennamo
ATTORNEY

INVENTOR
HALBERT M. HARRIS, JR
BY Anthony D. Cennamo
ATTORNEY

INVENTOR.
HALBERT M. HARRIS, JR
BY Anthony D. Cennamo
ATTORNEY

INVENTOR.
HALBERT M HARRIS, JR.
BY
ATTORNEY

INVENTOR
HALBERT M. HARRIS, JR
BY
ATTORNEY

United States Patent Office 3,506,785
Patented Apr. 14, 1970

3,506,785
SYNCHRONIZED ASYNCHRONOUS FACSIMILE COMMUNICATION SYSTEM

Halbert M. Harris, Jr., Webster, N.Y., assignor to Xerox Corporation, Rochester, N.Y., a corporation of New York Filed Sept. 30, 1966, Ser. No. 583,358
Int. Cl. H04l 7/04
U.S. Cl. 178—69.5 11 Claims

ABSTRACT OF THE DISCLOSURE

A hybrid facsimile communication system for transmitting synchronous video signals with digital sync signals. Multiplexed on the same channel as the asynchronous video signals are synchronized digital control words utilized to establish synchronization between a facsimile receiver and a facsimile transmitter.

This application relates to synchronized communication systems and, more particularly, to improved means and methods for synchronizing facsimile transmitters and receivers.

Facsimile is representative of communication systems in which a received signal conveys no meaningful information unless referenced to a time-scale shared by the transmitter and receiver. In conventional facsimile systems this is accomplished by inserting a pulse or tone burst between each interval corresponding to a scan line. These timing signals can be identified at a receiver and used to establish synchronism between transmitter and receiver. However, all available forms of long distance communication circuits introduce various types of distortion as well as various types of noise into the transmitted signal which can cause the synchronizing signals to be detected at times differing in random or periodic fashion from their true times or to be missed altogether. When a noisy or badly distorted circuit is used at or near its maximum transmission speed, the received facsimile image becomes badly distorted because individual scan lines are randomly displaced in a longitudinal direction and vertical lines, assuming horizontal scanning, become ragged or even unrecognizable. Digital facsimile represents one way of improving synchronization in the presence of distortion and noise. In this system, all signal transistions are constrained to take place at exact integral multiples of a clock signal which can be accurately recreated at the receiver, and used to control the receiver timing. However, this system suffers from many disadvantages. It is more expensive than ordinary non-digital facsimile. For a given transmission speed and circuit bandwidth, the received images appear to be of much lower resolution than non-digital facsimile because of the discontinuous positioning of the individual recorded picture elements. It will be understood that for economic reasons facsimile signals are normally transmitted at such speed relative to the transmission circuit bandwidth that the individual image elements are readily discernible to the naked eye. Digital facsimile is best transmitted over special digital transmission circuits which are optimized for this form of transmission and which provide synchronized clock signals at both transmitting and receiving ends. However, these circuits are not widely available. Finally, digital facsimile is not readily adapted to the transmission of tonal gradations such as are involved in sending pictures as well as certain types of business forms, letters, and handwritten materials without multilevel coding and a corresponding decrease in speed. The present invention combines the economy, quality, and availability of conventional asynchronous analog facsimile transmission at its best, with the extreme stability heretofore obtainable only in digital systems.

It is, accordingly, a principal object of the invention to provide positive synchronization facsimile systems which impose no restriction on the character of the video signals.

Additional objects will become apparent in connection with the following description and drawings.

FIG. 1 shows a signal format used with the circuits of FIGS. 2–5. The part of the digital signal exclusive of the sync character may be a succession of alternating binary "ones" and "zeros."

Figure 2:
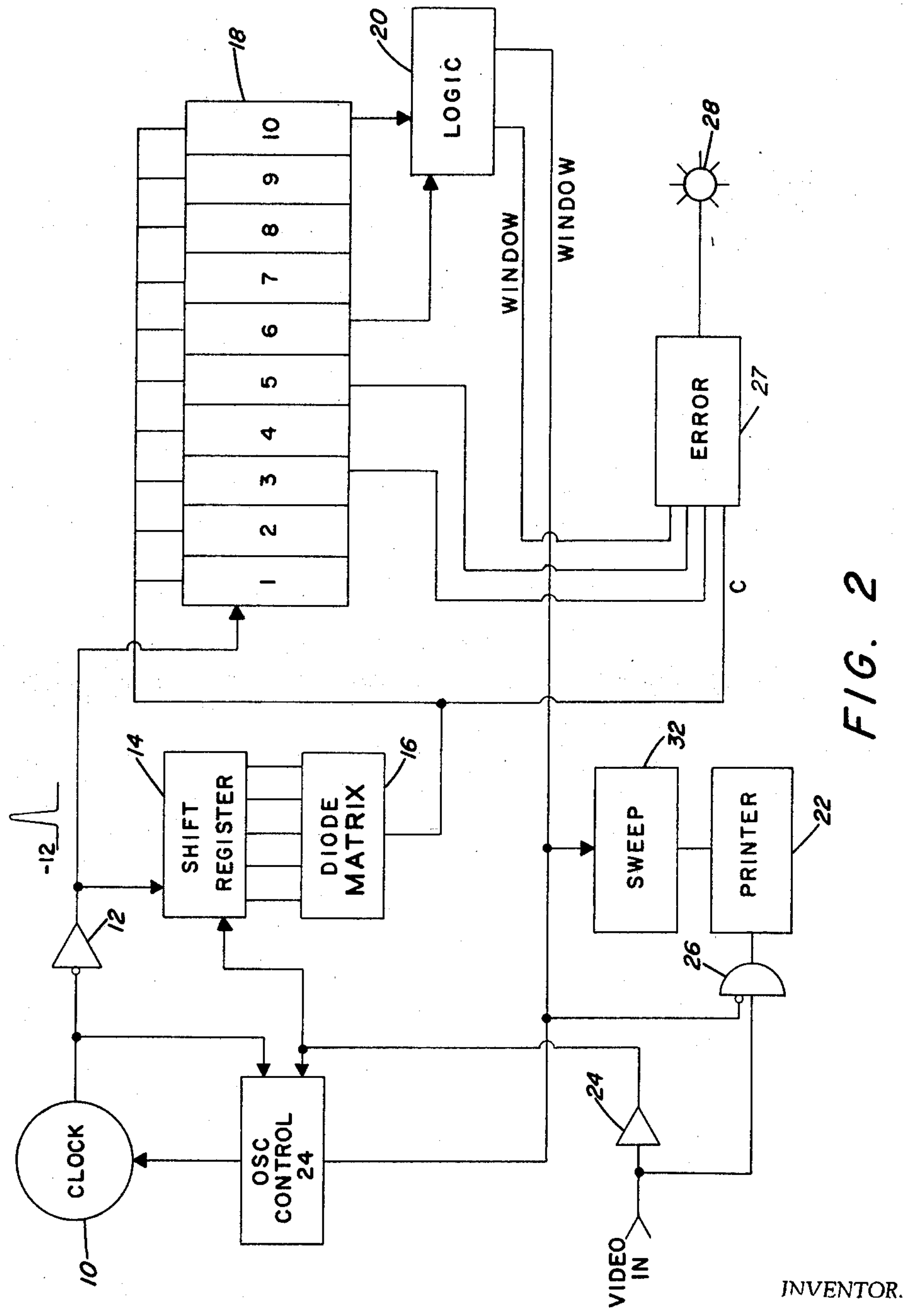
FIG. 2 is a schematic diagram of a facsimile receiver for use with the signals of FIG. 1.
Figure 8:
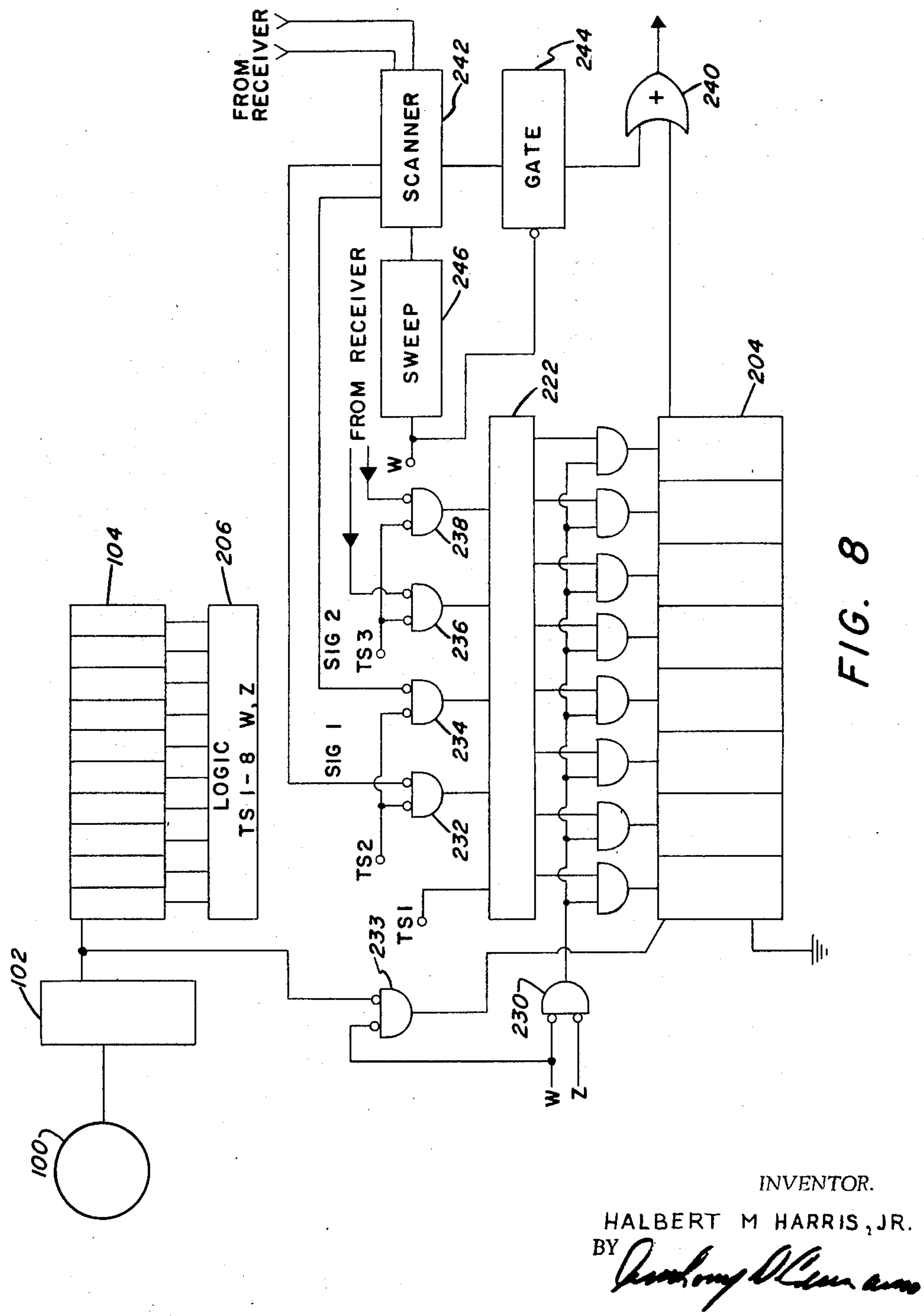
FIG. 8 is a block diagram of a facsimile transmitter corresponding to the received of FIG. 7.

FIG. 2 is a block diagram of a simple facsimile receiver according to the invention. The corresponding transmitter is not shown but a more complex form of transmitter according to the invention is shown at FIG. 8. The receiver includes a 250 kilocycle, crystal controlled clock oscillator 10, the illustrated receiver being adapted for use with a communication circuit having a bit rate of 250 kilobits corresponding to a bandwidth of at least about 125 kilocycles. A corresponding oscillator will be provided in the transmitter, not shown. The oscillator output is passed through a squaring amplifier 12 which provides pulses of the proper voltage levels required by the other components of the receiver. Illustratively, these levels are 0 volts for a logical "1" and −12 volts for a logical "0." These pulses are applied as shifting pulses to a five-stage shift register 14 and are counted in a ten-stage counter 18. The "0" outputs of the sixth and tenth stage are connected to a logic circuit 20 which derives a window signal extending from count 0 to count thirty-two. The received facsimile input signal passes through an amplifier 24 which converts it to the same 0, −12 volt levels used elsewhere in the receiver. The signal from amplifier 24 is passed through shift register 14 which is connected to a decoding diode matrix 16, which is adapted to recognize a particular five-bit digital word generated by the transmitter as a synchronizing signal. When this word is fully loaded into the shift register 14, diode matrix 16 will generate an output pulse which is used to preset counter 18 to the proper count corresponding to the receipt of the synchronizing word. Illustratively, the transmitter periodically transmits a thirty-two bit digital sequence of which the synchronizing word constitutes bits seventeen through twenty-two. Detection of the synchronizing word will then be used to set counter 18 to a count of twenty-two. At the next reception of the synchronizing word, the window signal from logic 20 will admit the entire thirty-two bit digital signal and the synchronizing word will be detected at a count of twenty-two, so that the signal generated by diode matrix 16 will not change the state of counter 18. In this manner, an approximate synchronization is achieved between the transmitter and the receiver, but the receiver clock may not yet be operating in phase with the transmitter clock. For this purpose, oscillator 10 includes a control element such as a voltage variable capacitor to permit the oscillation frequency to be adjusted over a small range in response to a control signal from oscillator control circuit 24.

Figure 3:
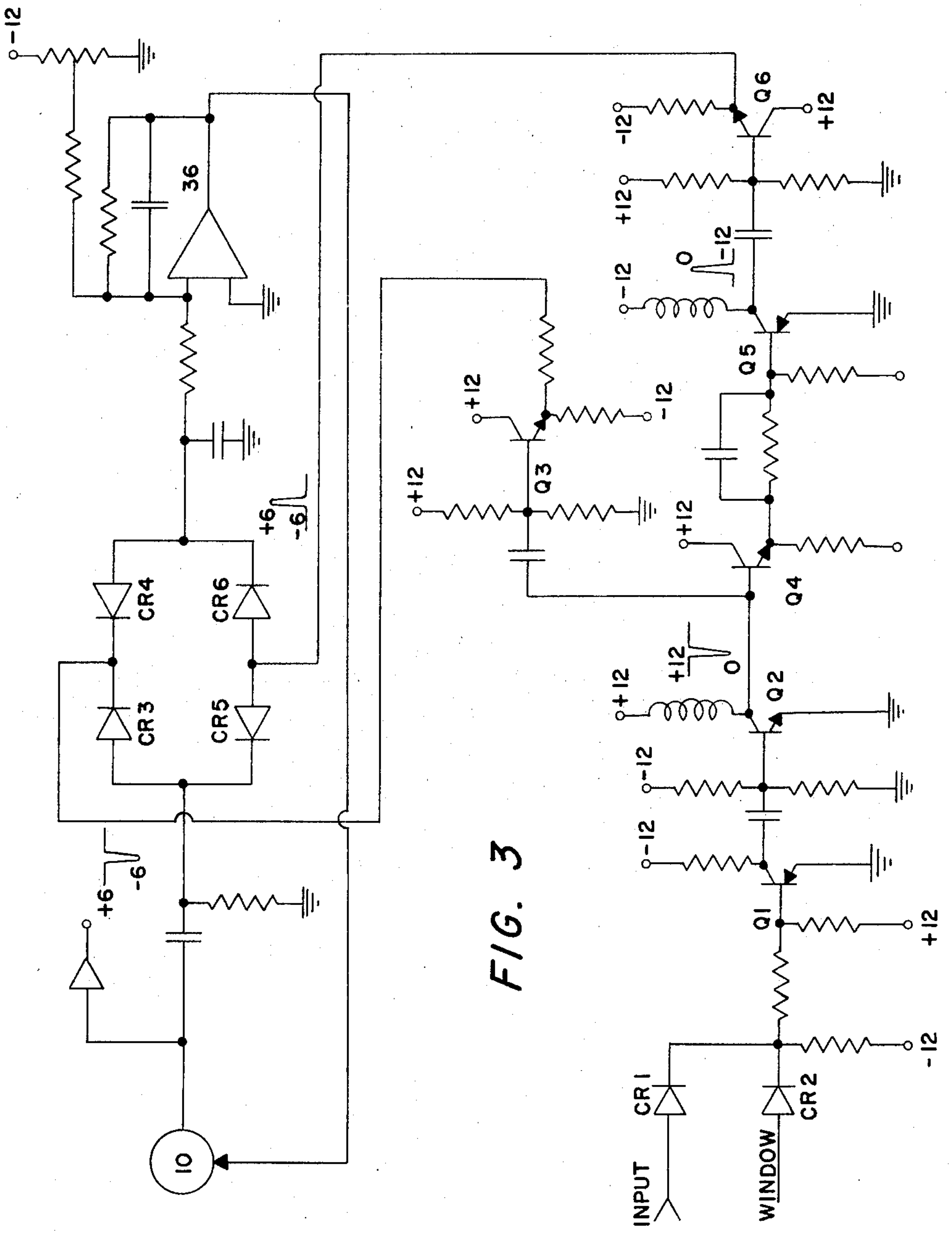
FIG. 3 shows the oscillator control circuit of FIG. 2.

Oscillator control circuit 24 compares the phase of clock oscillator 10 with that of the transitions in the thirty-two bit received digital signals and generates a control signal to bring the oscillator into phase with the received digital signals. The control circuit is shown in greater detail in FIG. 3. The window signal from logic circuit 20 is used to gate the input signal in a gating circuit comprising diodes CR1 and CR2. The gated signal is amplified by transistor Q1 and inverted and shortened to a sharp spike in a capacitive coupled, inductively loaded, amplifier Q2. The resulting negative-going pulse which corresponds to the negative edge of the input signal is shifted in level by transistor Q3 and applied to the common terminal of diodes CR3 and CR4. The pulse from Q2 is also inverted by transistors Q4 and Q5, shifted in level by Q6, and applied to the common terminal of diodes CR5 and CR6. Diodes CR3 through CR6 form a switch which is open only during the short interval when pulses are applied from transistors Q3 and Q4. These pulses which are derived from the received digital signal are used to sample signals from clock oscillator 10 to derive a phase error signal. The phase error signal is integrated and amplified by operational amplifier 36 and returned as a frequency control signal to oscillator 10, thus providing a phase lock loop to keep oscillator 10 synchronized with the received digital signals. Except for the interval determined by the window signal, the diode switch remains closed and integrating operational amplifier 36 holds the same correction signal until the next sequence of digital signals is received. In this way, oscillator 10 and counter 18 are maintained in synchronism even though most of each scan cycle, i.e., the recycling time of counter 18, may be used for the transmission of non-digital signals. The non-digital signals are applied through a gate 26, controlled by the window signal from logic 20 to a facsimile printer 22, which can be of any conventional type. Thus, scanning can be carried out by such means as a cathode ray tube, a mirror galvanometer, a rotating polygon mirror, or a rotating helix, and recoding can be effected by a beam of light impinging on a photosensitive surface, or by a stylus pressing on a pressure sensitive material, or by passing an electric current through an electro-sensitive recording paper. Gate 26 prevents the digital signal from being recorded and a sweep generator 32 also actuated by the window signal, generates the sweep signals to operate cathode ray tube recorders or motor control signals for mechanical recorders. No constraints whatever ae imposed on the natue of the signal transmitted outside of the time allotted to the digital signal.

Figure 4:
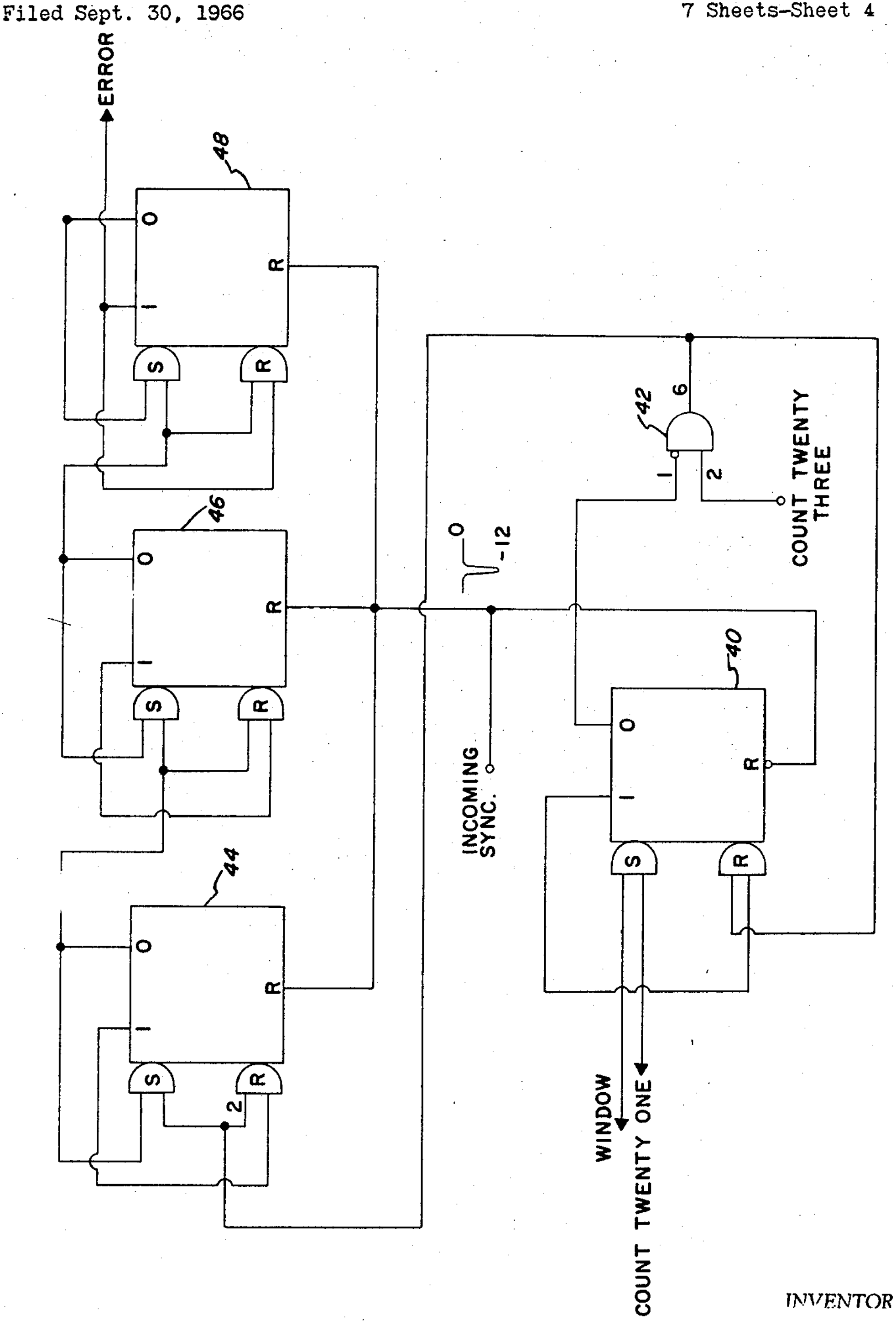
FIG. 4 shows the error circuit of FIG. 2.

Referring again to FIG. 2, there is shown an error detection circuit 27 connected to a signal light 28. Circuit 32 is shown in greater detail in FIG. 4. Flip-flop 40 is set every time counter 18 reaches a count of twenty-one. When the circuit of FIG. 2 is properly synchronized to an incoming signal, an incoming sync word will be detected at count twenty-two and immediately reset flip-flop 40. Under these conditions, the rest of the circuit shown in FIG. 4 remains inactive. If, however, the sync word is not detected before count twenty-three, a coincidence will be detected in NAND circuit 42 which will reset flip-flop 40. The output signals from NAND circuit 42 are also counted in a three-stage counter consisting of flip-flops 44, 46 and 48. If a sync word is subsequently detected, all flip-flops will be reset, otherwise flip-flop 48 will produce an error signal after four consecutive failures to detect the sync word. This signal can be used to alert the operator of the facsimile receiving equipment and, where a return communication link exists, can be used to signal the operator of the remote transmitting equipment.

Figure 5:
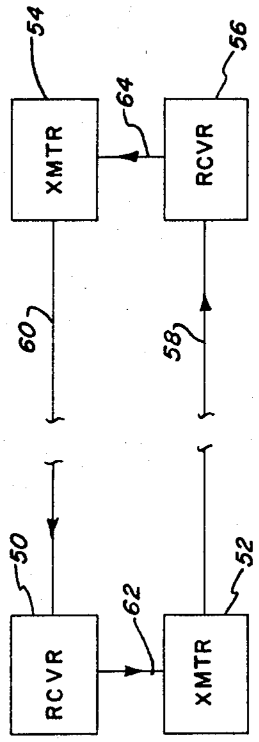
FIG. 5 shows a full duplex facsimile system.
Figure 7:
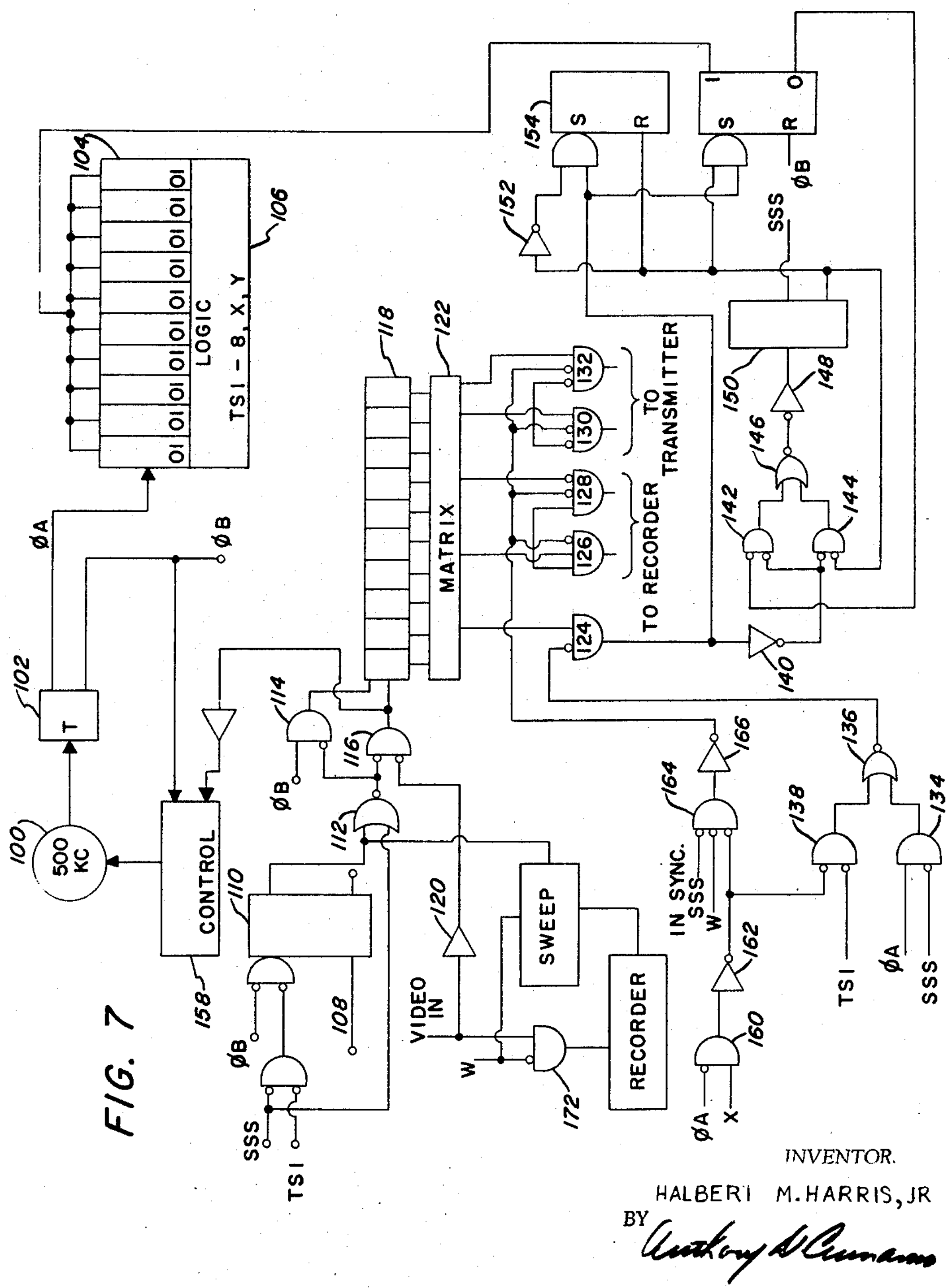
FIG. 7 is a block diagram of a more complex facsimile receiver.

FIG. 5 is a highly simplified representation of the full duplex type of operation which can be achieved by the apparatus shown in FIGS. 7 and 8. A facsimile receiver 50 and a facsimile transmitter 52 are provided at a "west" location and a similar receiver 56 and transmitter 54 are provided at an "east" location. Transmitter 52 is linked to receiver 56 by an eastbound transmission circuit 58 and transmitter 54 is linked to receiver 50 by a westbound transmission circuit 60. A local link 62 is also shown between receiver 50 and transmitter 52 and a local link 64 betweer receiver 56 and transmitter 54. By means of local links 62 and 64 together with multiplexing equipment in transmitters 52 and 54 and demultiplexing equipment in receivers 50 and 56, it is possible for a receiver to send control signals back to its associated transmitter without using any circuits other than the video transmission circuits 58 and 60 and local links 62 and 64. Thus, a control signal from receiver 56 is sent via local link 64 to transmitter 54 where it is multiplexed into the transmitter output and sent to receiver 50 where the control signal is separated out and sent via local link 62 to transmitter 52. Similarly, receiver 50 can send signals to transmitter 54 via local link 62, transmitter 52, receiver 56, and local link 64. This desirable form of operation can be accommodated by the further embodiment of receiver and transmitter shown in FIGS. 7 and 8, respectively. The modified receiver in FIG. 7 is shown in greater detail than that of FIG. 2 and includes additional features to prevent false detection of a synchronizing word.

Figure 1:
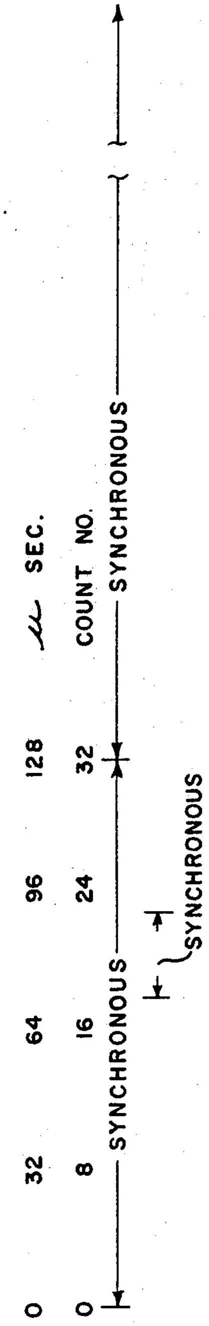
FIG. 1 shows a signal format according to the invention.
Figure 6:
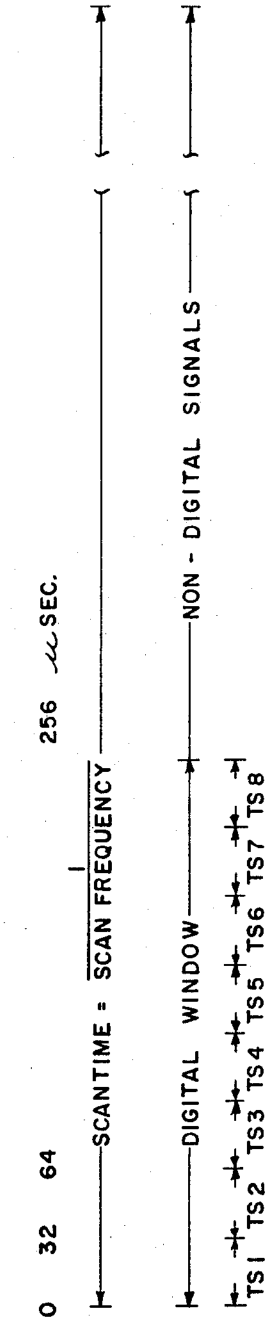
FIG. 6 shows a more complex signal format.

In the following embodiment, the signal configuration, as shown in FIG. 6, consists of a sequence of sixty-four consecutive digital bits divided up into eight words of eight bits each, the remainder of each scan period being given over to asynchronous signals.

Figure 9:
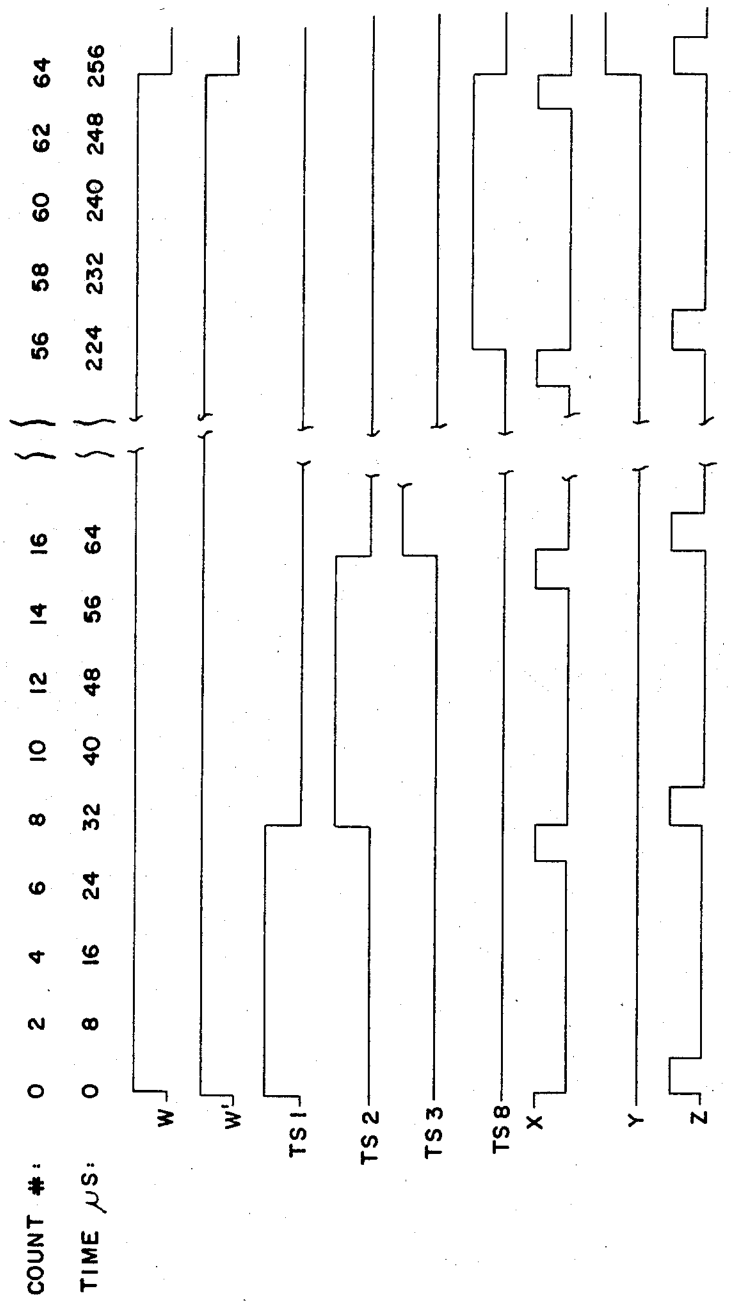
FIG. 9 illustrates waveforms encountered in the circuits of FIGS. 7 and 8.

The receiver of FIG. 7 like that of FIG. 2 is intended for use with a 125 kilocycle communication line, but clock oscillator 100 is a 500 kilocycle oscillator, the output of which is divided down to a 250 kilocycle square wave by flip-flop 102. One output is identified as Phase A and used to drive an eleven-stage counter 104. The opposite phase is identified as Phase B and is used as a timing signal elsewhere in the circuit. The outputs of counter 104 are connected to a logic circuit 106 which provides the timing signals required for receive operations. Time slot signals TS1 through TS8 consist of pulses extending from 1 to 8 counts, 9 to 16, 17 to 24 . . ., respectively as shown in FIG. 6. There is also a signal X which appears at the counts of 7, 15, 23, etc., and a signal Y which appears at count 64 through 96, 128 through 160, etc. These and the pertinent waveforms are shown in FIG. 9. A gate 108 detects coincidences between the TSI signal and a signal identified as SSS, which indicates a synchronized condition and is derived from a part of the illustrated circuit which has not yet been described. Two microseconds after the coincidence is detected, at count one-half, flip-flop 110 is set by phase B and creates the window signal W which lasts until flip-flop 110 is reset at count 64 by signal Y. In the absence of synchronization, signal W is not generated. Signal W and the SSS signal are combined in a NOR gate 112, the output of which is low only during the window interval, except in the out-of-sync condition, when it is low continuously. The output of gate 112 is applied to gate 114 which gates Phase B into the shifting input of shift register 118, an eight-stage register. The output of gate 112 is also applied to gate 116 which gates the standard level video signals from squaring amplifier 120 through the signal input of shift register 118. Shift register 118 is connected to a diode matrix 122 which is adapted to recognize various eight-bit digital words and produce an output signal on a particular line for each such word. The outputs are connected to gates 124, 126, 128, 130 and 132, respectively.

Only five gates are shown for simplicity, but in practice matrix 122 could recognize many more words to be associated with many more gates. The first of these gates, 124, is connected to that output of the matrix which is responsive to the assigned synchronizing word. Initially, before a synchronized condition has been established, gate 124 is activated through gates 134 and 136 at every signal from clock 100. The first detected synchronizing word signal sets presync flip-flop 156, since the sync single shot 150 is initially in the zero condition. Flip-flop 156 is immediately reset by Phase B but meanwhile resets counter 104 to a count of eight, the normal count at which sync should be detected, and enables the inverted sync pulse from inverter 140 to pass through gates 144 and 146 and inverter 148 to set the sync single shot 150. This circuit is a one shot multivibrator which generates the SSS signal and remains in the set condition for a predetermined time after the last pulse received at its input terminal. It thus performs a function essentially identical to that of error circuit 32 of FIG. 2, since it reverts to the reset condition after a predetermined number of consecutive sync signals have been missed. Single shot 150 disable flip-flop 156 so that it cannot thereafter be set. It also enables gate 108 and removes one input from gate 112 so that the window signal can be generated by flip-flop 110 and can control the operation of shift register 118. Since oscillator control circuit 158 is supplied with signals taken from the input to shift register 118, oscillator 100 is phase-locked only with respect to signals received during the window interval, and only after the first sync word has been detected. The output of single shot 150 also disables gate 134 so that subsequent enabling signals to the sync word gate 124 must instead come from gate 138. One input to gate 138 is the TS1 signal, which extends from count 1 to count 8, and the other input is derived from gate 160 and inverter 162. Gate 160, in turn, is energized by the X signal which appears at count 7, 15, 23, etc., and by the downward transitions of the Phase A clock signal. Accordingly, gate 138 and therefore gate 124 is activated only at count 7½, which is when the sync signal should appear at gate 124 in the synchronized condition. If the second successive sync word is in fact detected at the proper time, it will pass through gate 144, which is now enabled by single shot 150, and prevent the single shot from resetting itself. The sync pulse will also set flip-flop 154, which is now enabled by single shot 150 and inverter 152, to generate a signal which indicates that synchronism has now been positively established. This signal can be used to activate the facsimile recording apparatus 168 and the sweep control circuits 170 which are controlled by the window signal from flip-flop 110. This signal is also used to gate the video signals applied to the recorder through a video gate 172. The signal from flip-flop 154 can also be applied to the adjacent transmitter for transmission back to the remote transmitter.

The waveform from inverter 162 is also applied to gate 164 together with the window signal and the output of flip-flop 154. The resulting signal, which appears only at counts 7½, 15½, 23½, 31½, 39½, 47½, 55½, and 63½, and only when sync has been established, is applied to gates 126, 128, 130, 132 and any other character detection gates which may be employed. Gates 126 and 128 are also connected to the TS2 signal, and gates 130 and 132 are connected to the TS3 signal. Thus, gates 126 and 128 are activated only at count 15½ when the second eight-bit word should appear in shift register 118, and gates 130 and 132 are activated only at gate count 23½ when the third word should appear in the shift register. As illustrated, only one digital word is transmitted during the first time slot, but two possible sequences can be transmitted during the second or later time slots. This is clearly not the only possible arrangement. Any of the word positions provided, including that used for synchronization, can be used to translate a single digital sequence or one of two or more predetermined sequences. Unused time slots, such as the fourth to the eighth in the illustrated embodiment, may be used to transmit a succession of alternating digital "ones" and "zeros" in order to provide additional signals for clock phase correction. Illustratively, the two decoded signals from the second time slot can be used to receive supervisory signals from the associated transmitter while the signals detected in the third time slot are sent to the physically adjacent transmitter and represent control signals from the remote receiver.

If the sync word repeatedly fails to be detected at the assigned time, sync single shot 150 will eventually reset and cause the receiver to again search the entire cycle for a sync word by holding gates 114, 116 and 134 open. The resetting of single shot 150 will also reset flip-flop 154 to generate a warning out-of-sync signal.

Assuming a shift frequency of 250 kilocycles, the illustrated eleven-stage counter 104 will provide a cycle time of 16, 192 microseconds. In many installations, it is desirable to have a different or variable cycle time, corresponding to a variable facsimile scan rate, for transmitting high resolution images at low speed or low resolution images at high speed. This may be readily accomplished in the illustrated circuit by using the downward transition of the last time slot signal, e.g. TS8, to preset counter 104 to some count greater than 64. In this way, the effective counter capacity can be reduced from 2,048 to any desired lesser number. Obviously, the transmitter must be adjusted for the same cycle time.

FIG. 8 shows a facsimile transmitter suitable for use in conjunction with the receiver of FIG. 7. Clock oscillator 100 and counters 102 and 104 are the same as their counterparts in FIG. 5. Logic circuit 206 is somewhat modified. Time slots TS1 through TS8 are produced exactly as in FIG. 5 but the window signal W′ can be generated by the logic circuit and can start at count 0 rather than count ½. Signals X and Y are not required and a new signal Z is provided which appears at count 0, 8, 16, etc. Diode matrix 222 is the inverse of that shown in FIG. 7 and produces a unique pattern of voltages on its eight output lines when energized by any of its input lines. The first input is connected to the TS1 signal and produces the characteristic sync word. The next two inputs are connected to the outputs of gates 232 and 234 which are jointly enabled by the TS2 signal. An input is supplied to one or the other of these gates from scanner 242 to insert one of two digital control words in the second time slot. Gates 236 and 238 are jointly enabled by the TS3 signal and generate one of two words for insertion in the third time slot in response to control signals received from a companion receiver at the same location. Additional time slots can be used for transmitting such additional information as address codes to an automatic signalling center or for other purposes. Each of the digital words formed in diode matrix 222 are entered in parallel into the shift register 204 by gates 231 which are enabled in parallel by the output of gate 230. The output of gate 230 consists of the Z signals which appear within the window interval, i.e., at counts 0, 8, 16, 24, 32, 40, 48, and 56. The shifting signals applied to shift register 204 are simply the clock signals gated in gate 233 by the window signal. The output of shift register 204 consists of serial eight-bit digital words and is supplied to combining circuit 240. The output of facsimile scanner 242 is gated in gate 244 by the window signal W and is applied to combining circuit 240 the output of which is a composite consisting alternately of random signals from scanner 242 and digital signals from shift register 204. This composite signal is applied to a transmission line for transmission to a remote receiver such as that of FIG. 7. The window signal is also applied to sweep circuit 246 to synchronize the operation of facsimile scanner 242 with counter 104.

With the present invention, stable, intelligible facsimile images have been transmitted over circuits so noisy that the received images were nearly obliterated by "snow" and conventional facsimile transmission was impractical.

The above circuits are for illustrative purposes only and it will be understood that the invention is useful for transmitting signals other than facsimile signals and that other circuits and signal formats be employed within the scope of the claims.

What is claimed is:

1. A synchronized facsimile transmission system comprising:
- a transmitter at a first location;
- a receiver at a second location;
- an asynchronous tarnsmission circuit connecting said transmitter to said receiver;
- multiplexing means at said transmitter to time division multiplex short repetitive digital signals with longer asynchronous video signals time referenced to said digital signals;
- coding means at said transmitter to insert at least one predetermined digital word in said digital signal;
- synchronizing means at said receiver to achieve bit and frame synchronism between received digital signals and an internally generated signal; and
- means referenced to said internally generated signal to utilize said received video signals.

2. The system of claim 1 in which said coding means is adapted to insert selected ones of a plurality of digital words in said digital signal and said receiver includes a synchronous decoder to detect said digital words.

3. The system of cleam 2 further including:
- a receiver at said first location;
- a transmitter at said second location;
- means connecting each receiver with the coding means of its co-located transmitter; and
- means connecting the decoder of each receiver with its co-located transmitter, whereby each receiver can signal its remote transmitter over the communication circuit connecting its co-located transmitter with said transmitter's remote receiver.

4. A facsimile transmitter comprising:
- a clock signal generator;
- timing means driven by said clock generator to produce timing signals at a predetermined scanning frequency;
- a facsimile scanner synchronized to said timing signals for generating asynchronous video signals;
- digital signal generator means synchronized with said clock generator and timing signals to produce a fixed length digital signal incorporating at least one digital word at a fixed location within said signal; and
- multiplexing means to transmit an output signal comprising, alternately, said digital signal and asychronous video signals from said facsimile scanner.

5. The transmitter of claim 4 in which said digital signal generator can controllably incorporate preselected digital words in preselected portions of said digital signal.

6. A facsimile receiver comprising:
- an adjustable frequency clock signal generator;
- timing means driven by said clock generator to produce timing signals at a predetermined scanning frequency;
- a facsimile recorder synchronized to said timing signals;
- a decoding circuit to detect a digital word time division multiplexed in an incoming signal;
- a reset circuit responsive to said decoding circuit to reset said timing means to a predetermined phase with respect to said digital word;
- a clock adjustment circuit for comparing the phase of said clock generator with incoming signals and adjusting the frequency of said clock generator so as to phase lock said clock generator to said incoming signals;
- a gate circuit controlled by said timing circuit to disable said adjustment circuit except for a repetitive interval at said scanning frequency.

7. The facsimile receiver of claim 6 in which said decoding means is enabled to detect the second and subsequent synchronizing words only at the predetermined times at which said such words should appear.

8. The receiver of claim 7 in which said decoding means is adapted, after the first synchronizing word is received, to decode a plurality of digital words appearing in different portions of said digital signal.

9. The receiver of claim 6 further including a monitor circuit to detect, after synchronization is established, a predetermined number of consecutive missed synchronizing words and means responsive to said indication to permit the decoding means to detect the synchronizing word at any time.

10. The receiver of claim 9 in which said monitor circuit comprises a bistable flip-flop.

11. The receiver of claim 9 in which said monitor circuit comprises a counter and means to generate an input signal to said counter whenever the synchronizing word is not detected, and means to reset said counter whenever a synchronizing word is detected.

References Cited

UNITED STATES PATENTS

| | | | |
|---|---|---|---|
| 2,979,565 | 4/1961 | Zarcone | 178—50 |
| 3,069,504 | 12/1962 | Kaneko | 178—69.5 |
| 3,317,669 | 5/1967 | Ohnsorge | 178—69.5 |
| 3,426,148 | 2/1969 | Shimabukuro | 178—69.5 |

ROBERT L. GRIFFIN, Primary Examiner

J. C. MARTIN, Assistant Examiner